E. Heaton,
Shoe Sole,
No. 2,935. Reissued May 19, 1868.
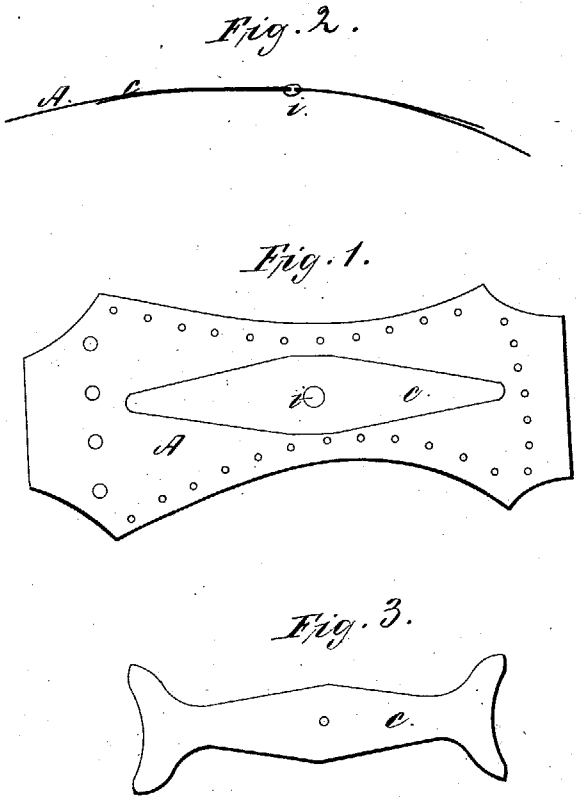
Witnesses:
Hulbard Berle
Rufus Sanford
Inventor:
E. Heaton
By his Atty
John E. Earle
H. PETERS, PHOTO-LITHOGRAPHER, WASHINGTON, D. C.

United States Patent Office.

EDWARD HEATON, OF NEW HAVEN, CONNECTICUT.

*Letters Patent No.* 41,701, *dated February* 23, 1864; *reissue No.* 2,935, *dated May* 19, 1868.

IMPROVEMENT IN METALLIC SHANKS FOR BOOTS AND SHOES.

The Schedule referred to in these Letters Patent and making part of the same.

TO ALL WHOM IT MAY CONCERN:

Be it known that I, EDWARD HEATON, of New Haven, in the county of New Haven, and State of Connecticut, have invented a new Improvement in Shanks for Boots and Shoes; and I do hereby declare the following, when taken in connection with the accompanying drawings, and the letters of reference marked thereon, to be a full, clear, and exact description of the same, and which said drawings constitute part of this specification, and represent, in—

Figure 1, a plan or top view of a shank made in accordance with my invention.

Figure 2, a longitudinal section of the same; and in

Figure 3 a modified form of the spring or elastic strip which forms part of the shank.

Heretofore shanks for boots and shoes have usually been made of a single thin piece of sheet steel, that metal being the best for the purpose. After they are struck out, by means of a press or otherwise, from the sheet metal, it becomes necessary to give them a spring temper, which can only be properly done by hammering them. Not only is this operation laborious and expensive, but the shanks are often unevenly tempered, which renders them liable to break in wearing. To avoid the labor and expense of tempering the shanks, as well as their liability to break, is the object of my invention, which may be stated in general to consist in forming a boot or shoe-shank of two strips united, the one being of a flexible but not necessarily elastic material, the other being of an elastic material; and also, in combining a tempered with an untempered spring, as and for the purposes hereinafter described; and also in combining with a boot or shoe-shank, of otherwise ordinary or suitable construction and material, a spring, as and for the purposes hereinafter described.

To enable others skilled in the art to understand and use my invention, I will now proceed to describe the manner in which the same is or may be carried into effect by reference to the accompanying drawings.

A is the shank, made of any ordinary or suitable form, cut from a piece of sheet steel, and punched, as shown in fig. 1, for the purpose of facilitating the operation of attaching it to the boot or shoe. Under my invention, this strip can be used without being tempered, and in the form and condition in which it comes from the several dies employed in cutting out, bending, and punching, and it will therefore be seen that this piece, which constitutes the shank proper, need not be elastic.

To this shank is attached an auxiliary elastic strip or spring, *c*, of steel, or other suitable material. The spring is first cut in the proper shape, as represented in fig. 1, and bent to the required curve, as seen in fig. 2, and then tempered in the ordinary manner, after which it is attached to the flexible strip A by a rivet, *i*, or in any other manner suitable for the purpose. The elastic strip may be made of any suitable form, so as to bear upon various points of the shank, as shown in fig. 3, but a spring of the shape seen in fig. 1 will be found to be, on the whole, the best and cheapest.

In a shank thus made, by uniting two strips of different degrees of elasticity, it will be seen that the main part A, which, while flexible, need possess little or no elasticity, has the requisite springiness imparted to it by the highly-elastic strip or spring *c*, and by this means not only is a better elasticity imparted to the shank than by any temper which can be given the piece A alone, but the danger of breaking, to which the latter has heretofore been liable from the causes above referred to, is completely obviated.

Having thus fully described my invention, what I claim as new and useful, and desire to secure by Letters Patent, is—

1. A boot or shoe-shank, composed of two strips, of different elasticities, the one being of a flexible but not necessarily elastic material, and the other of an elastic material, united, substantially as and for the purposes herein shown and described.

2. The combination of a tempered and an untempered spring, in the manner and for the purposes herein shown and set forth.

3. The combination, with a boot and shoe-shank, of otherwise ordinary or suitable construction and material, of a spring united with the said shank, so as to bear upon the same at both ends thereof, substantially in the manner herein shown and specified.

EDWARD HEATON.

Witnesses:

JOHN E. EARLE,

A. J. TIBBITS.